United States Patent Office 2,848,381
Patented Aug. 19, 1958

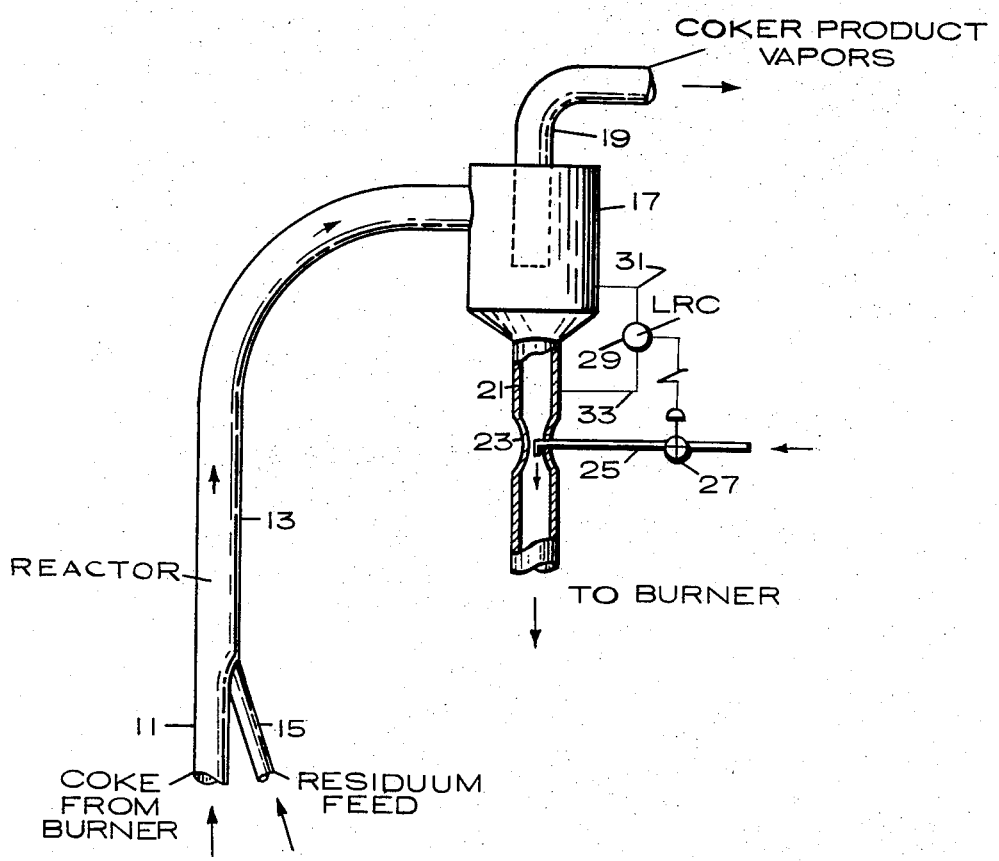

2,848,381

GAS-SOLIDS SEPARATION IN HIGH TEMPERATURE COKING

Edward W. S. Nicholson, Baton Rouge, La., assignor to Esso Research and Engineering Company, a corporation of Delaware Application December 16, 1953, Serial No. 398,548

2 Claims. (Cl. 196—55)

The present invention relates to an improvement in gas solids separation in high temperature coking. The invention has particular application to the production of chemical raw materials such as ethylene, propylene, butadiene, benzene, and other low molecular weight chemical raw materials by conversion of crude oil residua.

It has previously been suggested in the prior art that chemical raw materials of the type mentioned above may be produced by contacting residual petroleum oil momentarily with highly preheated solid particles. Various types of solids may be used such as mullite or ceramic beads, sand, metal shot, and the like, but coke particles which are produced in the process itself are commonly preferred as the solids which supply the heat for the coking operation. In general, the ratio of solids to feed by weight will be between 5 and 20, preferably 5 to 10. Coke particles having a size within the approximate limits of 40 to 400 microns average diameter are preferred as the heat carrying solids. They are preferably heated to a high temperature, usually between about 1250 and 1600° F.

One difficulty in processes of the type described above has been to terminate the conversion at the proper instant so as to avoid degradation of the products. The conversion reaction at the temperatures suggested above takes place very rapidly, within about .01 to 1 second, depending upon the precise temperature and the character of the residual oil being converted. At the end of this time it is desirable to separate the conversion products from the solids and to quench them to avoid polymerization and other degradation reactions which continue automatically if the temperature remains high.

According to the present invention the residuum feed, in finely divided form, is contacted with preheated coke particles in a transfer line reactor and the products are passed into a centrifugal type separator such as a conventional cyclone for separation of the vapors and gases from the solids. The process is accomplished with some formation of additional coke, which may be deposited upon the original preheated coke particles. As the products enter the centrifugal separator the solids are thrown to the exterior and the coker product vapors and gases are withdrawn from a central zone of the separator. In conventional cyclones, the separated solids collect in a bottom portion of the cyclone from whence they pass down a standpipe or dipleg. In the high temperature coking process this is very undesirable, because the separated solids contain adsorbed or unvaporized hydrocarbons which continue to react and crack at the high temperatures utilized in the process. These residual reaction products are of poorer product distribution than the primary reaction products because they come from the most refractory constituents of the original feed. Hence, it is very desirable to prevent these secondary reaction products from rising up through the cyclone bottom section and dipleg to mix with the primary reaction products which are being drawn off from the central zone of the cyclone separator.

According to the present invention, this is accomplished by applying an eduction force to the dipleg near the bottom of the separator to remove the secondary reaction products and to minimize accumulations of solids. This force acts also to accelerate the separation of solids from vapors in the cyclone proper by hastening the departure of the solids out of the separating zone.

The eduction just described is accomplished by forming a Venturi constriction in the solids exit line from the separating apparatus. A jet of a suitable gas or vapor, or in some cases a liquid, is injected downwardly within the constriction so as to accelerate the flow of vapors and solids from above through the constriction. This jet may be automatically controlled by a valve which is operated in response to the build up of deposits or accumulations of solids within the cyclone and in the exit thereof. The jet fluid, as well as the secondary vapor or gas products which are impelled downwardly thereby, may be recovered in any suitable manner or may be used as fuel if desired.

While the invention may take various forms, a preferred form is shown in the attached drawing which forms a part of this specification. It will be understood that this embodiment is merely exemplary.

Referring to the drawing, there is shown in elevation, with some parts broken away, a system for carrying out the present invention and an apparatus corresponding thereto. A reactor 13 in the form of a transfer line is adapted to receive a stream of preheated coke particles from a heater or burner not shown. These particles, preheated to a temperature of about 1250° to 1600° F., preferably between about 1300° and 1500° F., are let in through an inlet 11 into the reactor 13 which is so proportioned as to permit the optimum contact time between the residual oil and the coke particles. This contact time is usually quite short, ordinarily less than one second. A residuum feed, which also may be preheated to a suitable temperature, e. g. 300° to 600° F., is fed into the reactor in finely divided form through a feed line 15 from which it may be sprayed or otherwise subdivided to contact the coke particles as they flow in through inlet 11.

The reaction takes place rapidly and is partially completed by the time the particles and feed reach the end of the reactor which terminates in a cyclone separator 17. Substantial completion of the reaction takes place within the cyclone separator. Here, also, in conventional fashion, the solids are separated from the gaseous and vaporous conversion products by centrifugal force and the latter products are taken centrally and overhead through an outlet line 19. Here the vapor products may be quenched in a conventional manner by introduction of a spray of water or of previously cooled coker products. Build-up of solids in the bottom of the separator or cyclone 17 is controlled to a low level and return of secondary products to the cyclone is prevented in the following manner:

An outlet line 21 has formed therein a Venturi constriction 23 into which is inserted a downwardly directed nozzle member 25. A valve 27 controls the flow of a vapor or liquid such as hot steam or water, or gases from combustion in a burner or heater, not shown, so that the jet of gas or vapor accelerates the flow of the solids downwardly. For recovery of secondary vapor and gas products, light gaseous products may be recycled to the line 25. A level recorder controller 29 is connected by leads 31 and 33 to the bottom of the cyclone and the upper part of the outlet line 21, respectively. This level controller senses the presence of built-up accumulations of solids at the bottom of the separator and in response thereto allows the valve 27 to feed gas or vapor into the jet 25 and thereby educt or draw out the accumulated solids and prevent them from undergoing prolonged heating within the cyclone 17. At the same time the secondary reaction products from unvaporized components adhering to the solids are prevented from returning to the cyclone.

It will be obvious that various modifications may be made in the process and apparatus described above as will be apparent to those skilled in the art.

What is claimed is:

1. A chemicals coking process comprising contacting a hydrocarbon oil with particulate solids at a temperature above 1250° F. in a transfer line zone, cyclonically separating the suspension so formed in a separation zone, removing overhead from said separation zone gasiform conversion products, collecting separated solids in the lower portion of said separation zone, downwardly withdrawing the collected solids from said separation zone as a confined stream through a downwardly extending confined conduit having a venturi constriction, and directing a high velocity fluid stream downwardly into said constriction, responsive to the build up of collected solids in the lower portion of the separation zone whereby said collected solids are forcibly and rapidly withdrawn.

2. A process of coking a heavy residual oil which comprises contacting in a transfer line zone, 1 part by weight of said oil with 5 to 20 parts of particulate solids at a temperature in the range of 1250° to 1600° F. for a period of 0.01 to 1 second, introducing the suspension so formed into a cyclone type separation zone at a velocity sufficient to effect substantially complete solids separation, withdrawing gasiform conversion products overhead from said separation zone, collecting separated solids in the lower portion of said separation zone, downwardly educting the collected solids through a downwardly extending confined conduit having a venturi constriction, and downwardly injecting a high velocity gas into said constriction, the amount of said gas being in proportion to the amount of said collected solids.

References Cited in the file of this patent

UNITED STATES PATENTS

| | | |
|---|---|---|
| 1,245,540 | Wegner | Nov. 6, 1917 |
| 1,513,036 | Donaldson | Oct. 24, 1924 |
| 2,394,928 | Martin et al. | Feb. 12, 1946 |
| 2,420,534 | Gohr et al. | May 13, 1947 |
| 2,535,140 | Kassel | Dec. 26, 1950 |
| 2,598,058 | Hunter | May 27, 1952 |
| 2,731,508 | Jahnig et al. | Jan. 17, 1956 |

FOREIGN PATENTS

| | | |
|---|---|---|
| 7,804 | Great Britain | Oct. 3, 1913 |
| 703,690 | France | Feb. 10, 1931 |
| 1,046,485 | France | July 8, 1953 |